United States Patent
Klaumünzer et al.

(10) Patent No.: US 12,124,901 B2
(45) Date of Patent: Oct. 22, 2024

(54) DEVICE FOR LOCALLY ASSIGNING ELECTRONIC DATA TO A SOLID BODY AND SYSTEM FOR LABELLING AND IDENTIFYING SOLID BODIES

(71) Applicant: RUAG Ammotec GmbH, Fürth (DE)

(72) Inventors: Martin Klaumünzer, Nuremberg (DE); Armin Göhl, Erlangen (DE); Peter Biedermann, Lyss (CH)

(73) Assignee: RWS GMBH, Fuerth (DE)

( * ) Notice: Subject to any disclaimer, the term of this patent is extended or adjusted under 35 U.S.C. 154(b) by 295 days.

(21) Appl. No.: 17/775,135

(22) PCT Filed: Dec. 4, 2020

(86) PCT No.: PCT/EP2020/084576
§ 371 (c)(1),
(2) Date: May 6, 2022

(87) PCT Pub. No.: WO2021/115943
PCT Pub. Date: Jun. 17, 2021

(65) Prior Publication Data
US 2022/0391651 A1    Dec. 8, 2022

(30) Foreign Application Priority Data

Dec. 11, 2019 (DE) .......................... 102019008576.0

(51) Int. Cl.
*G06K 19/07* (2006.01)
*G06K 19/06* (2006.01)

(52) U.S. Cl.
CPC . *G06K 19/06028* (2013.01); *G06K 19/06037* (2013.01)

(58) Field of Classification Search
CPC .......................... G06K 19/07; G06K 19/06009
USPC .................................... 235/492, 494
See application file for complete search history.

(56) References Cited

U.S. PATENT DOCUMENTS

2006/0213105 A1*  9/2006  Cugliari ................ F42B 12/625
                                                    102/501
2013/0220160 A1*  8/2013  Burdine ................ F42B 12/385
                                                    124/56
2017/0176156 A1*  6/2017  Rubin ..................... F42B 12/20

FOREIGN PATENT DOCUMENTS

DE      102012022894 A1     5/2014
EP           1035950 B1     9/2000
EP           2508461 B1    10/2012

OTHER PUBLICATIONS

International Search Report and Written Opinion of the International Searching Authority dated Jun. 17, 2021 in counterpart international application No. PCT/EP2020/084576.
Office Action dated Jan. 15, 2021 in DE Appln. No. 10 2019 008 576.0.
International Search Report dated Mar. 2, 2021 of Appl. No. PCT/EP2020/084576 with partial translation.

* cited by examiner

*Primary Examiner* — Paultep Savusdiphol
(74) *Attorney, Agent, or Firm* — FITCH, EVEN, TABIN & FLANNERY, LLP

(57) ABSTRACT

The present invention relates to a device for locally associating electronic data to a solid body, such as a steel beam, in particular of data related to the solid body. Furthermore, the present invention relates to a system for marking and identifying solid bodies, such as steel beams.

27 Claims, 10 Drawing Sheets

Figure 1:
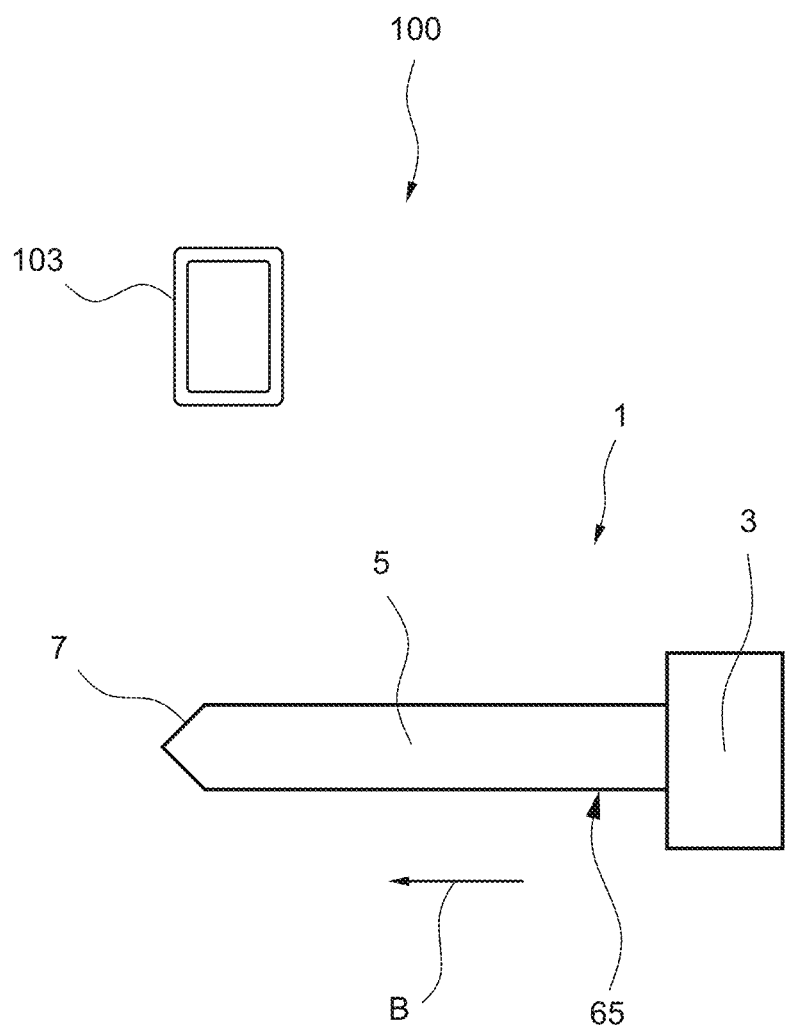

DEVICE FOR LOCALLY ASSIGNING ELECTRONIC DATA TO A SOLID BODY AND SYSTEM FOR LABELLING AND IDENTIFYING SOLID BODIES

CROSS-REFERENCE TO RELATED APPLICATIONS

This application is a U.S. national phase application filed under 35 U.S.C. § 371 of International Application No. PCT/EP2020/084576, filed Dec. 4, 2020, designating the United States, which claims priority from German Application No. 102019008576.0, filed Dec. 11, 2019, which are hereby incorporated herein by reference in their entirety The present invention relates to a device for locally associating electronic data with a solid body, such as a steel beam, in particular electronic data relating to the solid body. Furthermore, the present invention relates to a system for marking and identifying solid bodies, such as steel beams.

In the prior art, it is known to provide components and solid bodies, such as steel beams for the construction industry, for example for bridge structures or other buildings, with individual codes or information by means of stickers or plaques in order to be able to identify them again later. However, it has proven to be disadvantageous that the attachment by screwing or gluing on the plaques or the attachment of stickers is, on the one hand, time-consuming and, on the other hand, has an unsatisfactory durability and resistance against external influences, such as the effects of the weather. Furthermore, steel beams are reworked, for example by sandblasting, and/or guided and/or rolled over large roller belts, which can lead to the plaques or stickers being removed from the steel beam again.

In the state of the art, connection and fastening techniques are also known for connecting components to each other or for fastening a component to another component. Further connecting and/or fastening parts, such as threaded nuts in conjunction with screws or bolts, are used to achieve a (detachable) fastening of the connection.

It is an object of the present invention to overcome the disadvantages of the prior art, and in particular to provide a device for permanent local association of electronic data to a solid body, and a system for permanently marking and reliably identifying solid bodies.

This objective is solved by the object of claims 1, 9, 11, 20, 24 and 25.

Accordingly, a device is provided for locally associating electronic data to a solid body, such as a steel beam. Suitable materials for the solid body are in particular building materials, such as steel, non-ferrous metals, e.g. aluminum profiles, concrete, natural stone, e.g. sandstone, limestone, slate or marble, wood, plastics, asphalt, bitumen, glass, composite materials, e.g. reinforced concrete, biofabric or bone. For example, the device is arranged to be operated and/or non-destructively introduced into the solid body by a preferably pyrotechnic insertion device or applicator. By a solid body, the applicant understands a range of values from HV 100 to HV 600. For example, the device itself may have a hardness in the range of HV 600 to HV 2000. In general, the device according to the invention can be used to permanently associate data relating to the solid body thereto. The data may include, for example, at least one solid-body-specific identifier, such as an ID, and/or further data, such as origin, manufacturer, year of manufacture, etc. etc.

The device according to the invention comprises a, preferably readable or emitting, electronic data carrier for storing and/or providing the electronic data. The data carrier provided, for example, with the solid carrier individual identifier makes it possible to mark the solid body unambiguously and identifiably, i.e. to provide it with the individual identifier, in order to be able to identify or track it again at a later time. A data carrier can be understood to mean active or passive emitter and/or sensor units that can permanently make the data accessible. In the case of active emitting or transmitting units, a replaceable protective cap may be provided which has a battery or an accumulator, preferably with a photovoltaic cell, in order to supply the data carrier with electrical power. For example, the sensor units may be capable of sensing parameters such as pressure, temperature, humidity, pH-value of the solid body, tilt of the device and/or of the solid body, an acceleration of the device, and/or may comprise a biosensor ("lab on a chip"). Furthermore, the sensor units can be used to detect changes in the solid body, particularly with respect to the above parameters. Especially for solid bodies inside sensitive infrastructure, damage and/or hazards can be anticipated and/or avoided with the help of the sensor units. For example, long-term profiles can be created and/or fires can be indicated by means of a temperature sensor.

Furthermore, the device comprises an insertion vehicle that accommodates the data carrier. Preferably, at least one housing, one or more damping elements and/or one or more force deflection elements are provided. Corresponding damping elements made of plastic, such as silicone, or rubber are familiar to those skilled in the art. Suitable force deflection elements include, for example, honeycomb structures or other structural elements. According to one aspect of the present invention, the insertion vehicle is designed to be insertable into the solid at a velocity of at least 20 m/s and/or with an acceleration of at least 8,000 m/s$^2$. Different forces act on the device, in particular the insertion vehicle, for example when actuated by means of an insertion device, in particular operable by pyrotechnics, depending on the friction of the device on a guiding counter-surface, the shape of the device and also the choice of material. In particular, the insertion vehicle is designed in such a way that it can be inserted into the solid body at a speed of up to 400 m/s. Typical measured values here are 394.48 m/s or 380.60 m/s, but also depending on the device only 131.60 m/s or 316.80 m/s. The velocity is brought by a maximum acceleration (also here in an ideal case) of up to 44*10$^6$ m/s$^2$ when the device is activated, into a negative acceleration when the device enters the solid body of up to 19*10$^6$ m/s$^2$, to be decelerated to a velocity of zero. Due to these high acceleration forces, which to the knowledge of the applicant are also achieved in the range of nature, in particular a maximum measured acceleration of a sting when ejecting a nettle cell (53*10$^6$ m/s$^2$), the device serves to be able to be introduced non-destructively into solid materials with Rockwell values between 30 HRC to 70 HRC and/or with Vickers hardness values in the range of HV 100 to HV 600. For example, the device according to the invention is introduced into the solid body in such a way that the solid body is hardened at least in sections at the interface with the device. This creates a particularly stable and/or permanent seat for the device in the solid body.

In an exemplary embodiment of the device according to the invention, the insertion vehicle is shaped rotationally symmetrically with respect to a middle axis of the insertion vehicle. Alternatively or additionally, the insertion vehicle is shaped at least in sections, in particular along its complete longitudinal extension, wherein a longitudinal extension axis can be oriented coaxially to the middle axis, in an ogive-like, cone-like or/and cone-like manner, as well as a geometric mixture of the aforementioned shapes. For example, the insertion vehicle forms a housing shaped according to an ogive, in which the data carrier is accommodated, in particular centrally with respect to the middle axis.

In another exemplary embodiment of the present invention, the insertion vehicle includes a bow and a stern. When the present application documents refer to bow, bow-side, front or front-side; or to stern, stern-side or rear-side, these terms are to be understood with reference to a direction of insertion or movement of the insertion vehicle in the direction of the solid body. A recess, in particular a central recess, may be introduced in the tail, in which the data carrier is arranged. The data carrier may be arranged completely in the recess. Furthermore, the data carrier may be at least partially encapsulated within the recess. The encapsulation may protect the data carrier from external forces. Furthermore, in particular when the device is actuated by an applicator or insertion device, in particular when a force transmission part of a preferably pyrotechnic device or a preferably pyrotechnic device strikes the insertion vehicle, it can be ensured that the data carrier is not damaged, and thus that the data carrier can still be reliably read out even after actuation or insertion into the solid body. It has been found that the encapsulation can intercept and/or absorb the strong or high energy, in particular kinetic energy, transmitted or applied to the device by means of insertion devices, so that any undesired damage to the device and/or the data carrier can be avoided.

According to an exemplary further development, the data carrier is inserted into the recess in such a way that fastening forces acting between the data carrier and the recess wall are adapted to the forces transmitted in particular by the insertion device to the insertion vehicle, in particular acceleration forces as described above. The present invention makes use of the fact that the acceleration forces acting on the insertion vehicle are known and/or can be determined and that the necessary fastening forces can be set on the basis of this knowledge in order to provide a desired fastening and/or fastening depth, i.e. force resistance against removal of the data carrier from the recess, for example through the negative acceleration forces occurring during impact or entry of the device into the solid body.

In another exemplary further development of the device according to the invention, the fastening forces are adapted to the forces transmitted by the device in such a way that the data carrier remains in the recess, in particular irreversibly and fully functional, after the insertion of the insertion vehicle into the solid body. This ensures that the device can remain in the solid body for a long time and can be reliably identified by the data carrier.

According to a further embodiment of the device according to the invention, the insertion vehicle comprises a bow-side, in particular ogive-like, pointed sacrificial section and an adjoining tail-side protective section. It may be provided that the data carrier is arranged in the protective section, in particular that the recess is introduced. This protective section may particularly preferably be a destructible enclosure, a destructible guide device or a type of nail head element. In exemplary embodiments, the protective section may be part of a pin head, nail head, bolt head or rivet head or a cramp. The protective section may furthermore be that part of the device that is primarily actuated by the insertion device, in particular faces the force application part of the applicator or the device for inserting the insertion vehicle and/or which is struck by the force application part. The sacrificial portion, in particular, adjoining the protective portion may be, for example, a pin shaft, nail shaft, rivet shaft or bolt shaft or a cramp leg. The device can be designed such that at least the sacrificial section can be completely introduced into the solid body to be marked or identified, in particular non-destructively and/or with high acceleration/velocity. In a further exemplary embodiment, the device can be designed and/or set up in such a way that it can be completely introduced into the solid body, that is, the protective section including the sacrificial section.

In a further embodiment of the invention, the insertion vehicle is significantly larger in size in the longitudinal direction of the device than transversely to the longitudinal axis, particularly in the radial direction with respect to the middle axis.

According to an exemplary further development of the device according to the invention, the sacrificial section is arranged to substantially completely absorb the forces resulting as a consequence of the insertion of the insertion vehicle into the solid body, in particular acceleration forces and/or deformation forces. Furthermore, the sacrificial section may be adapted to remain substantially intact during the penetration of the insertion vehicle into the solid body.

In a further embodiment of the invention, the data carrier, in particular the recess, is arranged concentrically with respect to a middle axis of the insertion vehicle. Further, the insertion vehicle may have a rear-side flat annular force application surface for introducing the motion forces to be transmitted to the insertion vehicle. The motion forces can be provided, for example, by an insertion device, in particular by actuation by means of a force transmission part. The force input surface can be formed, for example, on a rear end face of the insertion vehicle. The annular shape of the force application surface can be formed around the central recess, for example.

According to a further aspect of the present invention, which is combinable with the preceding aspects and exemplary embodiments, a device for locally associating electronic data with a solid body, such as a steel beam, is provided. For example, the device is adapted to be operated and/or non-destructively inserted into the solid body by a preferably pyrotechnic insertion device. By a solid body, the applicant understands a range of values from 30 HRC to 70 HRC, in particular a range of values from 53 HRC to 65 HRC, e.g. 61 HRC, and/or from HV 100 to HV 600 (Vickers hardness). Thus, a range of values below 20 HRC is no longer a solid within the meaning of the application. In general, the device according to the invention can be used to permanently associate data relating to the solid body to it. The data can include, for example, at least one solid-body-specific identifier, such as an ID, and/or further data, such as origin, manufacturer, year of manufacture, etc.

The device according to the invention comprises a, preferably readable or emitting or transmitting, electronic data carrier for storing and/or providing the electronic data. The data carrier provided, for example, with the solid carrier specific identifier makes it possible to mark the solid body unambiguously and identifiably, i.e. to provide it with the individual identifier, in order to be able to identify or track it again at a later time. A data carrier can be understood to mean active or passive emitter or transmitter and/or sensor units that can render the data permanently available. In the case of active transmitting units, a replaceable protective cap can be provided which has a battery or accumulator, preferably with a photovoltaic cell, to supply the data carrier with power.

Furthermore, the device comprises an insertion vehicle containing the data carrier. Preferably, at least one housing, one or more damping elements and/or one or more force deflection elements are provided here. Such damping elements made of plastic, such as silicone or rubber, are familiar to those skilled in the art. Honeycomb structures, for example, are suitable as force deflection elements.

According to the further aspect of the invention, the data carrier is accommodated in a rear-side protective section of the insertion vehicle, forming a force application ring for introducing the motion forces to be transmitted to the insertion vehicle, in such a way that an uninterrupted force flow is enabled from a rear-side planar annular force application surface via the force application ring into a sacrificial section adjoining the protective section. According to a further development, the data carrier is arranged and the recess is dimensioned in such a way that the force flow from the force entry ring to a tip of the insertion vehicle axially opposite the force entry ring can extend or be directed uninterruptedly. The uninterrupted flow of force has an advantageous effect on the stability of the device, so that it remains substantially intact or dimensionally stable even after insertion into the solid body.

In another exemplary embodiment of the present invention, the data carrier is contained/accommodated in a recess formed in the insertion vehicle. The recess extends from a rear end face, in particular from the force application face, towards a point or tip of the insertion vehicle opposite the rear end face. In this regard, the recess may define an opening in the rear end face and/or the recess may be arranged substantially centrally with respect to a middle axis of the device or eccentrically, i.e., at a radial distance with respect to the middle axis. For example, the recess extends less than 50%, preferably less than 4% or less than 30% of a total longitudinal extent of the insertion vehicle. Furthermore, it may be provided that the recess has a recess floor that bounds the recess longitudinally and, for example, faces the central opening and/or is oriented substantially parallel to the end face where the central opening is formed. Furthermore, it may be provided that the data carrier and/or the protective housing are/is arranged substantially centrally in the opening, preferably coaxially with respect to a middle axis of the insertion vehicle.

According to another aspect of the present invention, which is combinable with the preceding aspects and exemplary embodiments, there is provided a device for locally associating electronic data with a solid body, such as a steel beam. For example, the device is adapted to be operatd and/or non-destructively inserted into the solid body by a preferably pyrotechnic insertion device. The applicant understands solid body to correspond to a range of values from 30 HRC to 70 HRC, in particular a range of values from 53 HRC to 65 HRC, e.g. 61 HRC, and/or from HV 100 to HV 600 (Vickers hardness). In general, the device according to the invention can be used to permanently associate data relating to the solid body thereto.

The data may include, for example, at least one solid-body-specific identifier, such as an ID, and/or further data, such as origin, manufacturer, year of manufacture, etc. etc.

The device according to the invention comprises a, preferably readable or emitting (transmitting), electronic data carrier for storing and/or providing the electronic data. The data carrier provided, for example, with the solid carrier individual identifier makes it possible to mark the solid body uniquely and identifiably, i.e., to provide it with the individual identifier, in order to be able to identify or track it again at a later time. A data carrier can be understood to mean active or passive transmitter and/or sensor units that can make the data permanently available. In the case of active transmitting units, a replaceable protective cap may be provided which has a battery or accumulator with preferably a photovoltaic cell to supply the data carrier with power. Furthermore, an antenna and/or an antenna amplifier can be provided in the protective cap, which can be brought into operative connection with the transmitting and/or sensor element by contacting it.

Furthermore, the device comprises an insertion vehicle containing the data carrier. Preferably, at least one housing, one or more damping elements and/or one or more force deflection elements are provided here. Corresponding damping elements made of plastic, such as silicone, or rubber are familiar to those skilled in the art. Honeycomb structures, for example, are suitable as force deflection elements.

According to the further aspect of the invention, the insertion vehicle is in particular completely accommodated in a transport vehicle. The transport vehicle may in particular have a guiding and/or precision function. For example, the transport vehicle forms a guiding and/or sliding contact with a corresponding guide element of an insertion device for actuating the device. The guide element may be formed as an elongated cylindrical device, such as a barrel or a profiled rail of other geometric shapes. For example, the transport vehicle is to be complementary to the guide element of the insertion device at least in sections of its outer periphery.

In another exemplary embodiment of the present invention, the transport vehicle is flush at the rear with a rear end face, in particular the force application point, of the insertion vehicle. In particular, the transport vehicle forms at the rear a housing-like annular portion surrounding the insertion vehicle. The transport vehicle may further comprise a jacket shaped in accordance with the insertion vehicle, which in particular opens into the ring section. The jacket may terminate flush with a rear end face, in particular the force application point, of the insertion vehicle. At its outer circumference, the jacket can be shaped ogive-like, in particular analogously to the insertion vehicle. Deviating from the ogive in shape, the longitudinal guide ribs extend substantially radially away from the jacket and parallel to the insertion vehicle longitudinal axis.

According to an exemplary further development of the device according to the invention, the transport vehicle, in particular the jacket, comprises at least 3, in particular at least 4, 5, 6 or at least 7, longitudinal guide ribs distributed in particular uniformly in the circumferential direction. The longitudinal guide ribs support the guiding and/or sliding contact with the guide element of the insertion device. In particular, the jacket is designed in such a way that only the longitudinal guide ribs come into contact with the guide element. Deviating from the ogive shape, the longitudinal guide ribs extend substantially radially away from the jacket and parallel to the insertion vehicle longitudinal axis. The longitudinal guide ribs may have guide surfaces facing away from the insertion vehicle and oriented substantially parallel to the insertion vehicle longitudinal axis. On the bow side, the longitudinal guide ribs can each have flat end faces that point in the longitudinal axis of the insertion vehicle and/or are oriented in a fan-like manner with respect to the middle axis.

In a further exemplary embodiment of the device according to the invention, the transport vehicle, in particular the jacket, has a flat disk on the bow side, on the outer circumference of which at least 3, in particular at least 4, 5, 6 or at least 7, guide lugs can be provided, in particular uniformly distributed in the circumferential direction, in particular convexly curved. The number of guide lugs can correspond to the number of longitudinal guide ribs and/or the guide lugs can be arranged offset from the longitudinal guide ribs in the circumferential direction. The longitudinal guide ribs can connect the bow-side disk and the stern-side jacket ring to one another in a strut-like manner, the insertion vehicle being free on the outside except in the region of the disk and the jacket ring, i.e. not surrounded by the transport vehicle. The longitudinal guide ribs can be arranged at a radial distance from the insertion vehicle.

According to an exemplary further embodiment of the device according to the invention, the data carrier is encapsulated in the recess. This makes it increasingly possible to ensure that the data carrier is not damaged when the insertion device is actuated, in particular when the force transmission part of the preferably pyrotechnic insertion device strikes the rear of the insertion vehicle, and thus the data carrier can still be read and/or transmitted even after actuation or insertion into the solid body. It has been found that the encapsulation allows the strong or high energy, in particular kinetic energy, transmitted or applied to the device by means of the insertion devices to be intercepted, deflected and/or absorbed, so that unwanted damage to the device and/or the data carrier can be avoided.

In a further embodiment, the insertion vehicle is guided and designed in such a way that a simplified accommodation of the device to be inserted can take place and is coordinated in such a way that the force transmission part of the insertion vehicle has been designed in such a way that the data carrier is excluded. In other words, the insertion vehicle may be deflected such that the actuation force introduced is directed as completely as possible around the data carrier. Force deflection elements may be integrated. According to an exemplary further development, the encapsulation is realized by a protective housing arranged in the recess and completely surrounding the data carrier. The protective housing can, for example, have a thin-walled wall structure that fits closely to the data carrier.

In a further exemplary embodiment of the device according to the invention, the protective housing is made of plastic or metal. The plastic material can be selected and/or dimensioned in such a way that, on the one hand, damage to the data carrier arranged in the protective housing and, if applicable, to the energy source is avoided and, on the other hand, reliable readability of the data carrier, in particular of the individual identifier, is made possible. Furthermore, the plastic housing can have corresponding predetermined breaking points or force deflection elements in order to protect the data carrier located inside. For example, the plastic may contain an additive reinforcing the plastic matrix and/or have a polymer matrix made of Hartz or a two-component polymer. The disclosed materials have been found to be particularly advantageous for the present invention.

According to an exemplary further development of the device according to the invention, the encapsulation is realized by embedding the data carrier in a plastic protective housing by means of a plastic injection molding process, such as cascade injection molding, ejection or extrusion. Further, the data carrier may be encapsulated by the protective housing, which preferably comprises resin or a two-component polymer. It has been found herein that the disclosed manufacturing processes are particularly well suited for the purposes of the present invention, in particular to produce a low-cost device and/or to provide secure containment/accommodation of the data carrier and, if applicable, the power source in the protective housing, while further ensuring that readout of the data carrier is still permitted in order to detect the individual identifier and/or to communicate with the data carrier, in particular to send data to the data carrier.

According to an exemplary further development of the device according to the invention, the protective housing is dimensioned and/or accommodated in the recess in such a way that a jacket of the stern at least partially surrounding the recess in the circumferential direction projects beyond the protective housing in the longitudinal direction of the device. In particular, an annular protrusion, for example, is formed. For example, the annular protrusion may protrude by at least 5% and/or at most 20% of the longitudinal extent of the recess. According to the invention, it has been found that additional protection of the data carrier arranged in the recess and/or, if applicable, of the energy source is achieved via the axial projection, since the force transmission part of the insertion device thus does not impact directly on data carrier or its energy source and/or protective housing for accelerating the device, but acts exclusively on the, for example, annular projection of the jacket. However, the protrusion can also assume other geometric shapes, such as polygonal, round or elliptical, and can also be partially interrupted, such as only segment or side sections of the geometric shapes.

According to an exemplary further development, the protective housing is positively and/or non-positively (frictionally) fastened in the recess. The fastening can be achieved, for example, by interlocking and/or interlocking of at least two associated connecting partners of the protective housing and the insertion vehicle. Furthermore, a non-positive (frictional) fastening can be achieved, for example, by oversizing an outer dimension of the protective housing with respect to an inner dimension of the recess, in particular by oversizing it in such a way that the protective housing including data carrier and possibly energy source remains in the recess even when actuated by means of an insertion device. Furthermore, it can be provided that the protective housing is preferably mechanically roughened on an outer side and/or provided with an additive that increases the coefficient of friction. An alternative fastening option is a material closure, e.g. by gluing the protective housing inside the recess.

The encapsulation can be designed and/or its material selected in such a way that the read-out of the data carrier, in particular of the stored data, such as the individual identification, is ensured and/or is not impaired. Readout is generally understood to mean the preferably cableless and/or contactless reading, retrieval and communication of data, such as the individual identifier, by a separate communication device, such as a readout device.

According to a further exemplary embodiment of the device according to the invention, the data carrier is arranged in a mounting element, in particular made of plastic, which surrounds the insertion vehicle. A mounting element may be understood to be a solid body manufactured separately from the insertion vehicle, which can be connected to the insertion vehicle. In one aspect, the mounting element may be used to attach the data carrier to the device at a suitable location, and in another aspect, to provide a guide within the delivery vehicle. In another embodiment, particularly when the data carrier is not included in the mounting element, the mounting element may also be sacrificed, in other words, the mounting element would shatter against the solid body upon full penetration of the insertion vehicle into the solid body. The mounting element may be made of plastic or a metal, a metal alloy, or a combination of corresponding materials. The data carrier may be completely encapsulated, in particular completely surrounded by plastic material of the mounting element. Furthermore, it is advantageous, in particular in the case of the mounting element made of plastic, that the readability of the data carrier, in particular the data communication with the data carrier, is improved, since the data carrier is not completely surrounded by metal material. According to an exemplary further embodiment of the device according to the invention, the mounting element has an internal thread and the insertion vehicle has an external thread, so that the mounting element can be screwed onto the insertion vehicle. According to an alternative embodiment, the mounting ring is pushed onto the insertion vehicle forming an interference fit, wherein in particular an inner dimension of the mounting ring is undersized with respect to an outer dimension of the insertion vehicle. In a further alternative embodiment, it is also possible to provide shaped portions and/or indentations which produce a secure connection by bayonet locking.

According to a further aspect of the present invention, which is combinable with the preceding aspects and exemplary embodiments, a device for locally associating electronic data with a solid body, such as a steel beam, is provided. For example, the device is arranged/designed such that it can be actuated and/or non-destructively inserted into the solid body by a preferably pyrotechnic insertion device. By a solid body, the applicant understands a range of values from 30 HRC to 70 HRC, in particular a range of values from 53 HRC to 65 HRC, e.g. 61 HRC, and/or from HV 100 to HV 600 (Vickers hardness). In general, the device according to the invention can be used to permanently associate data relating to the solid body thereto. The data may include, for example, at least one solid-body-specific identifier, such as an ID, and/or further data, such as origin, manufacturer, year of manufacture, etc.

The device according to the invention comprises a, preferably readable or transmitting, electronic data carrier for storing and/or providing the electronic data. The data carrier provided, for example, with the solid carrier individual identifier makes it possible to mark the solid body unambiguously and identifiably, i.e. to provide it with the individual identifier, in order to be able to identify or track it again at a later time. A data carrier can be understood to mean active or passive transmitter and/or sensor units that can make the data permanently available. In the case of active transmitting units, a replaceable protective cap may be provided which has a battery or accumulator with preferably a photovoltaic cell to supply the data carrier with power. Furthermore, an antenna and/or an antenna amplifier can be provided in the protective cap, which can be brought into operative connection with the transmitting and/or sensor element by contacting it.

Furthermore, the device comprises an insertion vehicle containing the data carrier. Preferably, at least one housing, one or more damping elements and/or one or more force deflection elements are provided here. Corresponding damping elements made of plastic, such as silicone, or rubber are familiar to those skilled in the art. Honeycomb structures, for example, are suitable as force deflection elements.

According to the further aspect of the invention, the data carrier is received by the insertion vehicle in such a way that an uninterrupted force flow is enabled from a central force application point at a rear end face into a lug of the insertion vehicle. In particular, the force flow can extend to a tip of the insertion vehicle axially opposite the force application point. According to the invention, it has been found that an uninterrupted flow of force from the force application point into the lug, in particular its point forming a force application point, has a beneficial effect on the stability of the device so that it remains substantially intact or dimensionally stable even after the insertion process, in particular setting process, and within the solid body.

According to an exemplary further development of the device according to the invention, the insertion vehicle has a stern-side force application point for an insertion device, such as in particular a preferably pyrotechnically operable device or a device for inserting the insertion vehicle. In this case, a force flow can be formed axially in the solid material of the insertion vehicle from the force application point into its lug, in particular its tip. Furthermore, it can be provided that the insertion vehicle is substantially intact along an axial connecting line between the force application point and the point of the substantially intact and/or consists of solid material. The fact that the force flow can preferably form or flow in a straight line axially in the solid material and/or along the connecting line between the force application point and the tip of the insertion vehicle forming the force application point means that the stresses acting within the insertion vehicle in the area of the data carrier due to the force application of the insertion device can be kept as low as possible.

According to another exemplary embodiment of the present invention, the insertion vehicle, in particular the stern of the insertion vehicle and the bow of the insertion vehicle, is made of one piece, in particular of metal, such as PM steel. Alternatively or additionally, a transition between the bow and the stern can be formed by solid material. In this way, it can be ensured that a stress peak-reduced force flow is provided from the force application point to the force discharge point. According to another exemplary embodiment of the present invention, the bow and the stern are made of multiple parts, in particular of two sections. Accordingly, the stern may be made of plastic or metal. In this embodiment, the bow is made of steel, for example hardened steel, hard metal, metallic glass, ceramics or the like, as well as mixtures thereof and/or alloys hardening the material. Further, the stern may also be omitted and replaced by a mounting member.

In another exemplary embodiment of the device according to the invention, the insertion vehicle has a middle axis. The data carrier can be arranged eccentrically with respect to the middle axis on the insertion vehicle. For example, the data carrier is arranged radially offset with respect to an axial connecting line between the force application point or the center of the force application point and the tip of the insertion vehicle, which forms the force application point. It was found that due to the eccentric arrangement of the data carrier, the structure of the device, which is essential for the force flow and stress relief, is to be weakened as little as possible, in particular to remain intact. Furthermore, due to the eccentric arrangement, it can be ensured that essentially only compressive stresses are induced in the insertion vehicle and essentially no shear stresses, which can lead to increased damage or stress peaks within the insertion vehicle and thus also in the area of the data carrier to be protected.

For example, when actuated by means of a pyrotechnically operable insertion device, different forces act on the device, in particular the insertion vehicle, depending on the friction of the device on a guide counter-surface, the shape of the device and the choice of material. If these general conditions are disregarded and the ideal acceleration is determined by tests and subsequent calculation, speeds of up to 400 m/s can be achieved with pyrotechnic initiation. Typical measured values here are 394.48 m/s or 380.60 m/s, but also, depending on the device, only 131.60 m/s or 316.80 m/s. The velocity is brought by a maximum acceleration (also here in the ideal case) of up to $44^6$ m/s$^2$ at initiation into a negative acceleration at entry of up to $19^6$ m/s$^2$ to be decelerated to the zero value. Due to these high acceleration forces, which to the knowledge of the applicant are also reached in the range of nature, in particular a maximum measured acceleration of a spine during the ejection of a nettle cell ($53*10^6$ m/s$^2$), the device can be introduced non-destructively into hard materials with Rockwell values between 30 HRC to 70 HRC and/or from HV 100 to HV 600 (Vickers hardness). Through series of experiments, the inventors found that an energy of up to 15 kJ, preferably e.g. an energy of 10 kJ, 8 kJ 5 kJ or 1 kJ must be expended in order to introduce the insertion vehicle into a solid body. However, it is apparent to the person skilled in the art that if the underlying mass is increased, the energy must also be increased accordingly.

In an exemplary embodiment of the device according to the invention, the data carrier has data, such as an individual identifier, in the form of digital codes or bar codes. For example, the codes may be one-dimensional, two-dimensional or three-dimensional bar codes. In contrast to plaques or stickers, codes have the particular advantage that many times more information can be stored in the codes than can be indicated on a plaque/sticker. According to an exemplary further development of the present invention, the data carrier is optoelectronically readable and/or digitally readable, preferably in order to identify the individual identifier and thus provide, for example, an assignment of steel beam to manufacturer. According to an exemplary further development, the digital readout is performed by means of electromagnetic waves. In this way, it is possible to achieve automatic and/or contactless identification and localization of the device.

According to a further exemplary embodiment of the device according to the invention, the data carrier comprises a transmitter for sending at least the individual identifier and, if necessary, a receiver for receiving signals from a separate communication device, such as a read-out device, in particular a reader or a scanner. Furthermore, the data carrier can also allow external access to the memory, for example in order to store additional data on the data carrier, to modify or rewrite data already stored and/or to delete stored data. In this respect, corresponding security precautions are also present on the data carrier, which only permit authorized access. In addition, such access can also be stored and documented in a cloud, for example.

The data carriers used are provided by the dimensions in the millimeter range. Common dimensions are in the area of a maximum of 10 mm×10 mm, or preferably 5 mm×5 mm, or especially preferably in a range of 2.6 mm×2.6 mm or less, whereby the base area need not be square in nature. For example, an area of 4.3 mm×3.6 mm would also be included. For example, the data carrier may be provided in a so-called bare structure in which an antenna-forming coil is visible and accessible from the outside. Furthermore, the steel beam itself may also act as an antenna by being suitably coupled to the data carrier. In a further exemplary embodiment of the device according to the invention, the data carrier has a preferably deenergized passive state in which the data carrier does not emit any signals. For example, the passive state is a deenergized or energy-less state in which the data carrier receives no energy, in particular is not energized. Further, the data carrier may have an active state in which the data carrier can emit or is emitting signals, such as the individual identifier. The active state can be characterized, for example, by the fact that the data carrier is powered, in particular supplied with energy.

According to an alternative embodiment of the device according to the invention, the data carrier can be supplied with electrical power, i.e. energized, both in the passive state and in the active state, whereby a switch or button can be provided for switching between the active and passive states. Hereby, switching from the passive state to the active state may be referred to as activating the data carrier and switching from the active state to the passive state may be referred to as deactivating the data carrier. In an exemplary embodiment, the data carrier switches from the passive state to the active state immediately before or immediately after actuation of the insertion device for inserting the device into a solid body. In particular, it may be provided that immediately before or immediately after actuation of the device by means of the insertion device, the data carrier is supplied with electrical energy.

According to an exemplary further development of the projectile according to the invention, the data carrier is supplied with power by an external energy source. For example, it can be provided that the data carrier can be energized with high-frequency radio waves from the outside by the external energy source. This may be realized by exposing the data carrier to a high-frequency alternating electromagnetic field containing high-frequency energy, which is used to supply power to the data carrier. In an alternative embodiment of the device according to the invention, an energy source, such as an electric battery, in particular a button cell, for supplying power to the data carrier is arranged in the recess and preferably in the protective housing. A button cell is generally an electrochemical cell, for example with a round cross-section, the height of which is smaller than the diameter, and which delivers voltages preferably between 1.35 volt and 3.6 volt. The small dimensions and sufficient voltage output of button cells allow their use in the recess of a device according to the invention to make the data carrier permanently readable. Depending on the electrode material, for example silver oxide, mercury oxide or lithium, button cells can be distinguished.

In a further exemplary embodiment, the energy source is arranged in the recess in such a way that the energy source is free from electrical contact with the data carrier in the passive state and is in electrical contact with the data carrier in the active state. Furthermore, according to the present invention, it may be provided that the data carrier and, if applicable, and the energy source are arranged in the recess, namely in particular in the protective housing, in such a way that the data carrier and, if applicable, the energy source remain(s) intact after insertion of the device into the solid body. The inventors of the present invention have found that this can be achieved by suitably arranging the data carrier and, if applicable, the energy source in the recess or the protective housing and/or dimensioning the mounting section.

In an exemplary further embodiment of the device according to the invention, an insertion vehicle jacket surrounding the recess has an internal thread which cooperates with an external thread of the protective housing in order to fasten, in particular screw, the protective housing in the recess. According to a further exemplary embodiment, the insertion vehicle jacket can have a latching part, such as a latching projection and/or a latching recess, on an inner jacket surface, which latching part interacts with at least one latching element, such as a latching recess and/or a latching projection, formed on an outer jacket surface of the protective housing, in particular adapted in shape thereto, in order to realize the fastening. The at least one latching part and the at least one latching element can be set up to secure the protective housing axially in the recess, in particular in a form-fitting and/or force-fitting manner. Furthermore, the fastening can be implemented in a detachable manner so that, for example, in the event of a defect in the data carrier and/or, if applicable, the energy source, it is possible to replace the data carrier and/or, if applicable, the energy source, in particular without having to remove the device from the solid body.

In an alternative further development of the device according to the invention, an insertion vehicle jacket surrounding the recess has an adhesive, preferably a two-component adhesive, to form a bond with the protective housing. Furthermore, epoxy adhesives or polyurethane adhesives or the like can alternatively be used as in general, polymerization adhesives or chemically curing and/or physically setting adhesives and joining means (connecting means). This allows the protective housing to be secured axially in the recess.

In a further exemplary embodiment of the device according to the invention, an insertion vehicle jacket surrounding the recess has an annular portion overlapping the end face of the protective housing in the radial direction. The annular portion preferably forms an undercut or undercut which is preferably formed at least partially circumferentially with respect to the longitudinal direction of the device. The undercut can provide additional axial securing of the protective housing against axial loss out of the recess.

According to an exemplary embodiment of the device, the device is made of galvanized carbon steel. This has proven to be particularly advantageous in terms of hardness and/or combination with a preferably pyrotechnically operable insertion device or insertion device and the resistance to penetration into hard solid material.

According to an exemplary further development of the present invention, the bow of the insertion vehicle is formed in the form of an elongated shaft which tapers to a tip of the bow. Furthermore, it may be provided that the tapered bow, in particular the tip, has an external thread and/or a knurl. The external thread and/or knurling may facilitate and/or strengthen the insertion of the device into the solid and/or the retention of the device in the solid body. For example, the elongated shaft is significantly larger in a longitudinal direction of the device than in a direction transverse to the longitudinal direction of the device. Further, the elongated shaft may be significantly larger in size in the longitudinal direction of the device than the stern portion, particularly the insertion vehicle jacket, surrounding the recess for the data carrier. Further, the insertion vehicle shroud may be significantly larger in size transverse to the longitudinal direction of the device than the elongated shaft.

According to another aspect of the present invention, which may be combined with the preceding aspects and exemplary embodiments, there is provided a system for marking and identifying solids, such as steel beams. With the system according to the invention, it may be possible, for example, in the construction industry, to mark and re-identify solid bodies, such as steel beams, for example to track details of manufacture, sale, processing, etc. This can be used, for example, in the case of damage and/or even collapse of structures, in order to identify by means of an origin tracing those solids which were responsible for the damage/collapse, and generally be used for root cause investigation.

The system according to the invention comprises a device, to be actuated in particular by means of a preferably pyrotechnic insertion device, for locally associating electrical data to the solid body.

The device, which may be generally configured according to any of the aspects described above or according to any of the exemplary embodiments described above, comprises an electronic data carrier for storing and/or transmitting the electronic data and has an insertion vehicle containing the data carrier and designed to penetrate the solid body, in particular without damaging the data carrier. Furthermore, the system comprises a separate read-out device for reading out, in particular reading, retrieving and/or communicating, the electronic data, preferably at least one solid body individual identifier, preferably without a cable and/or contact.

According to a further aspect of the present invention, which is combinable with the preceding aspects and exemplary embodiments, a system is provided in particular for locally associating electronic data to a solid body. The system according to the present invention comprises a device, in particular formed according to one of the aspects described above or according to one of the exemplary embodiments described above, for locally associating electronic data to the solid body and an insertion device, in particular a preferably pyrotechnically operable setting device, for actuating the device. By means of the insertion device, the device can be inserted into the solid body at a speed of at least 20 m/s and/or with an acceleration of at least 8,000 m/s$^2$.

Preferred embodiments are given in the subclaims.

Figure 2:
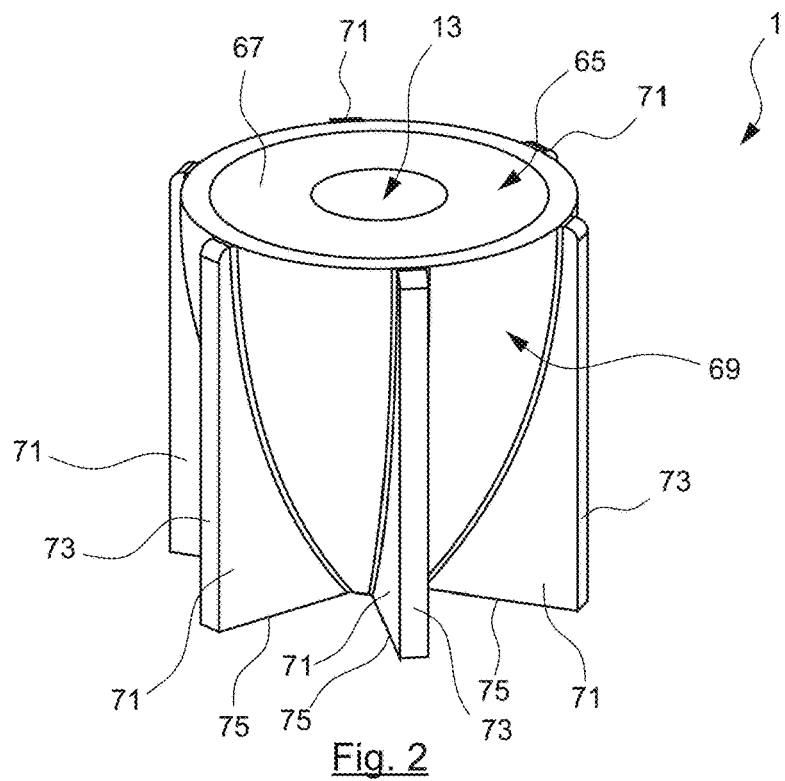
Figure 3:
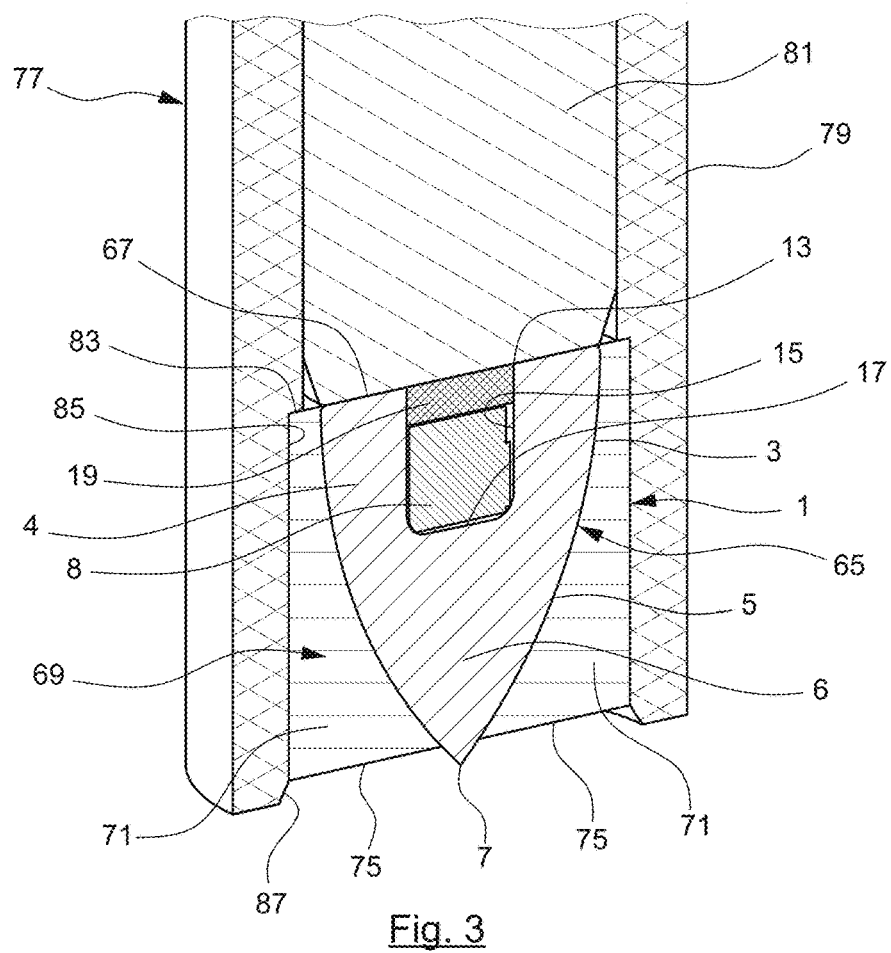
Figure 4:
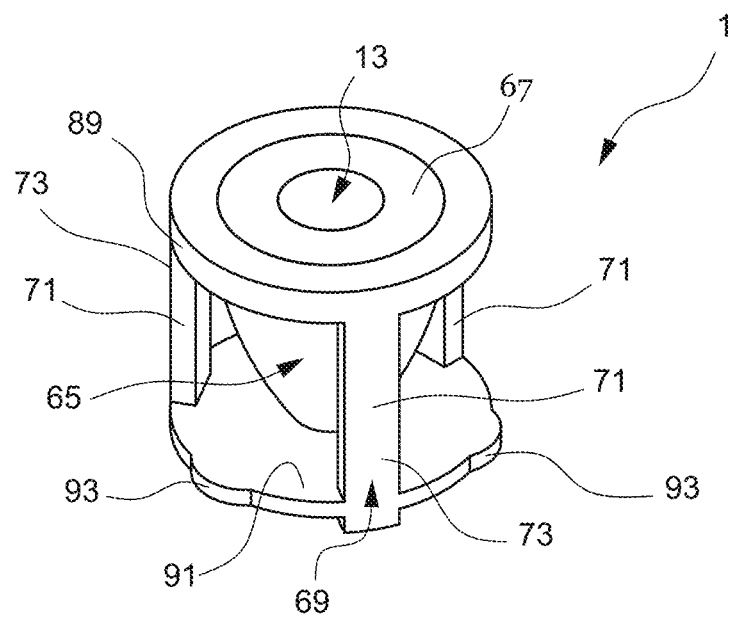
Figure 5:
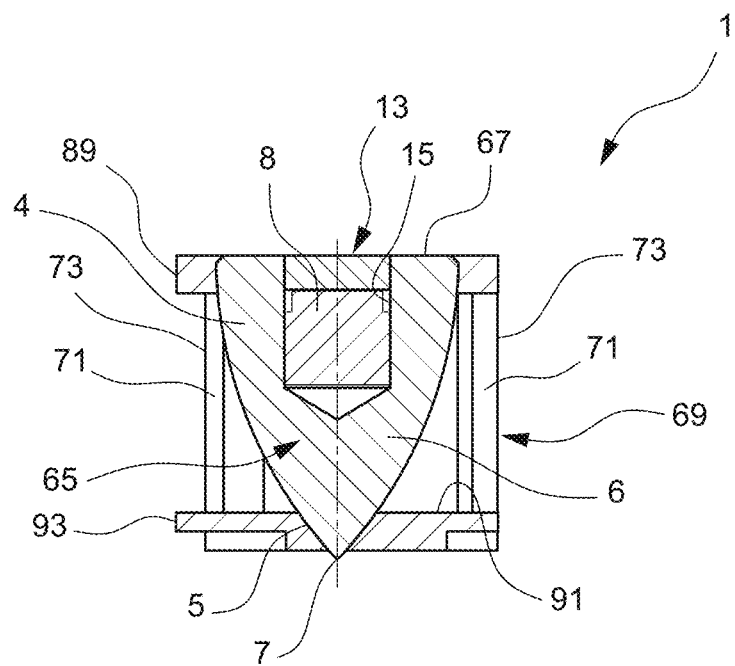
Figure 6:
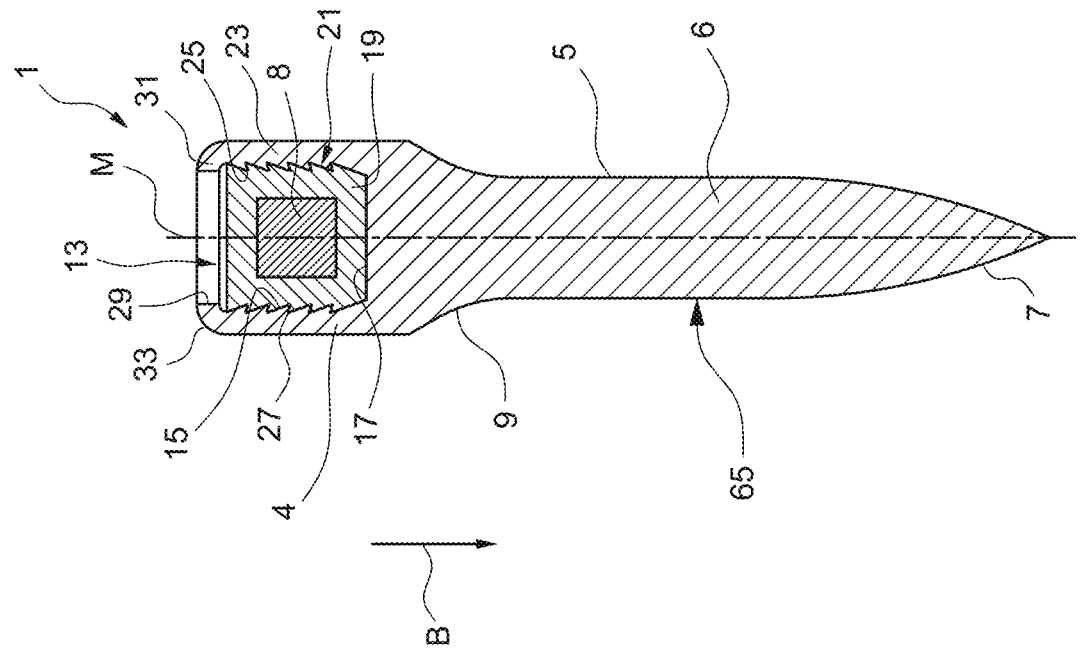
Figure 7:
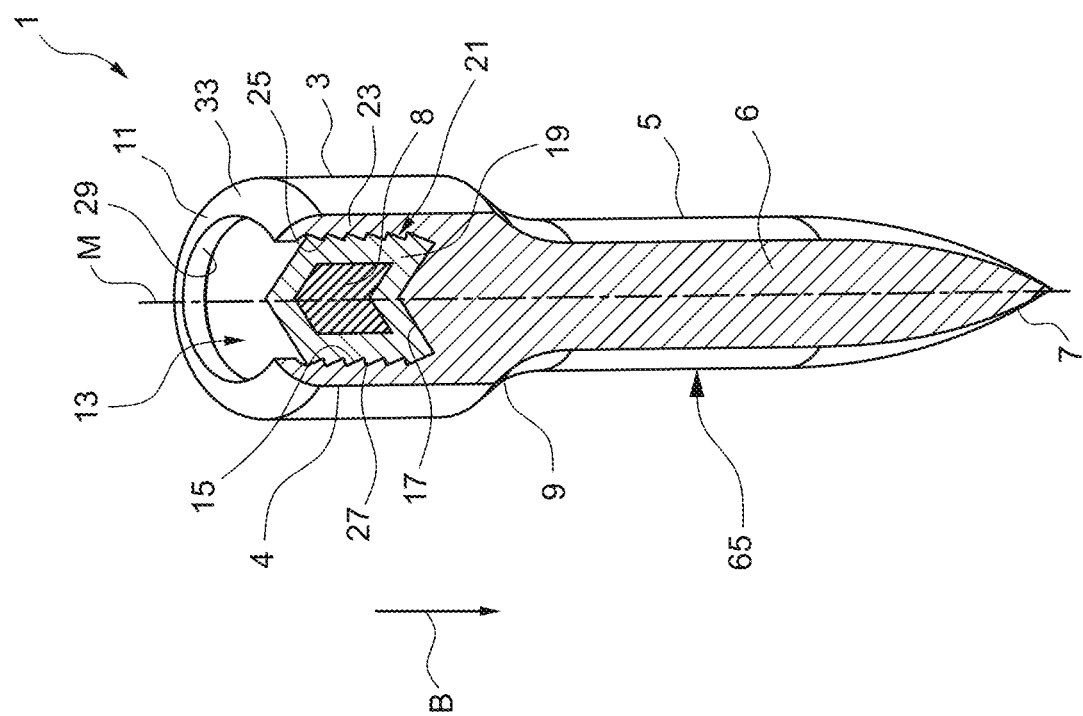
Figure 9:
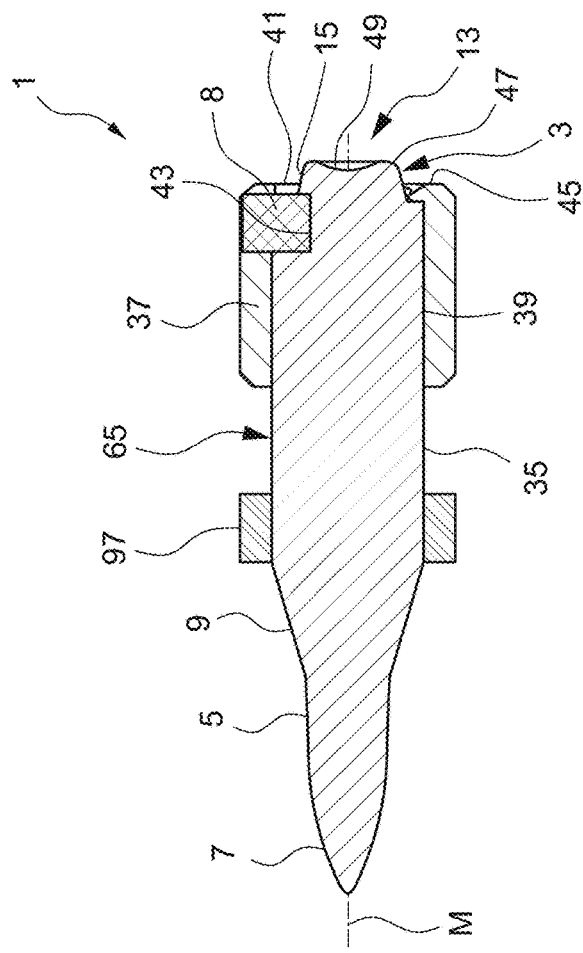
Figure 8:
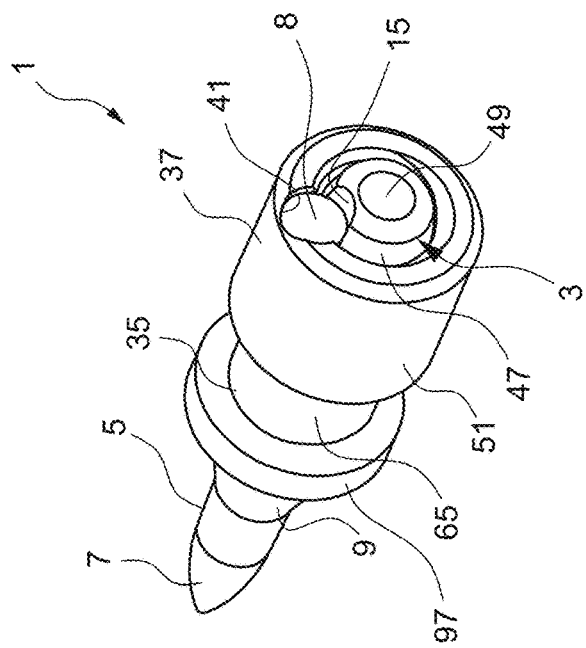
Figure 11:
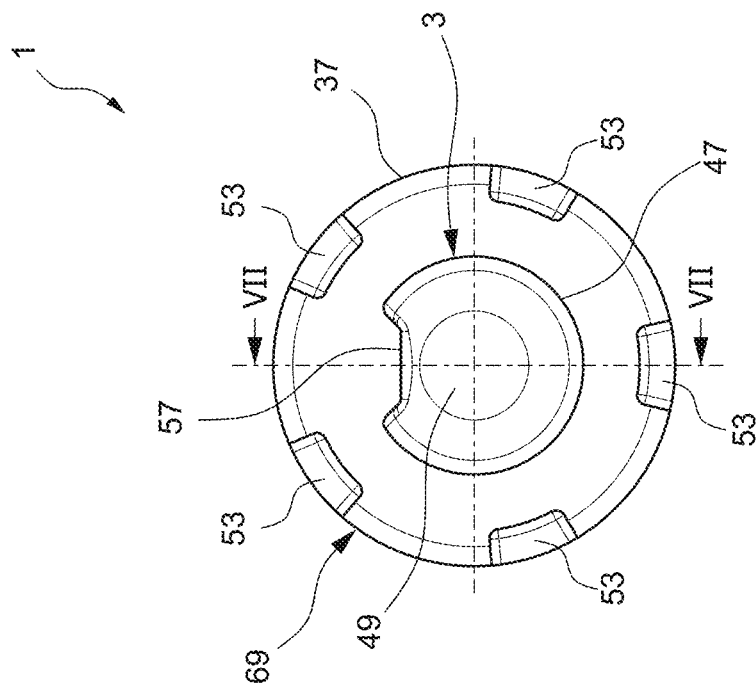
Figure 10:
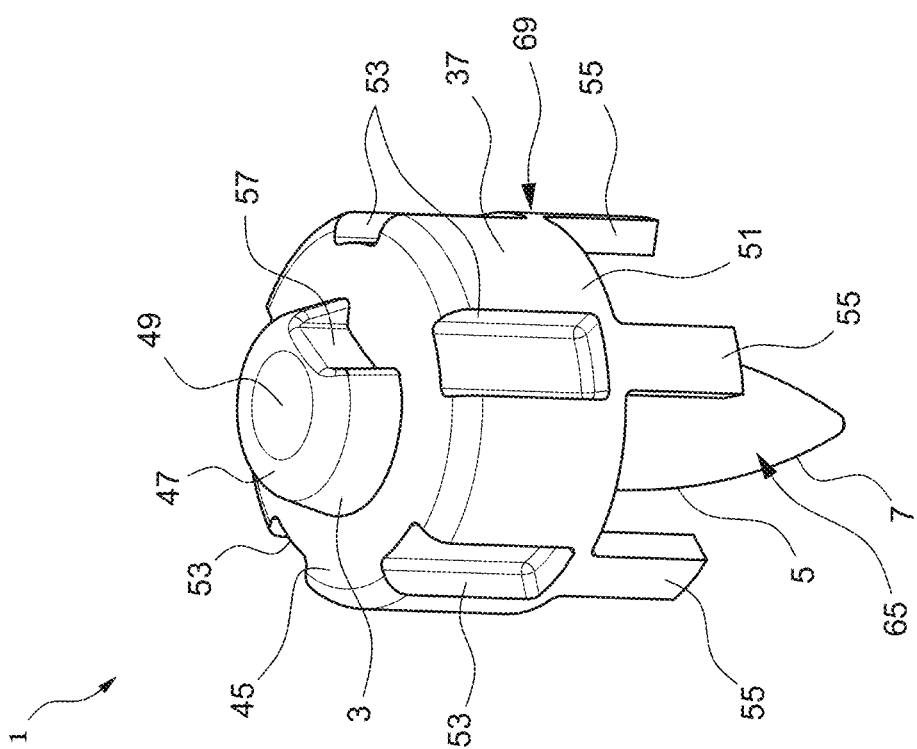
Figure 12:
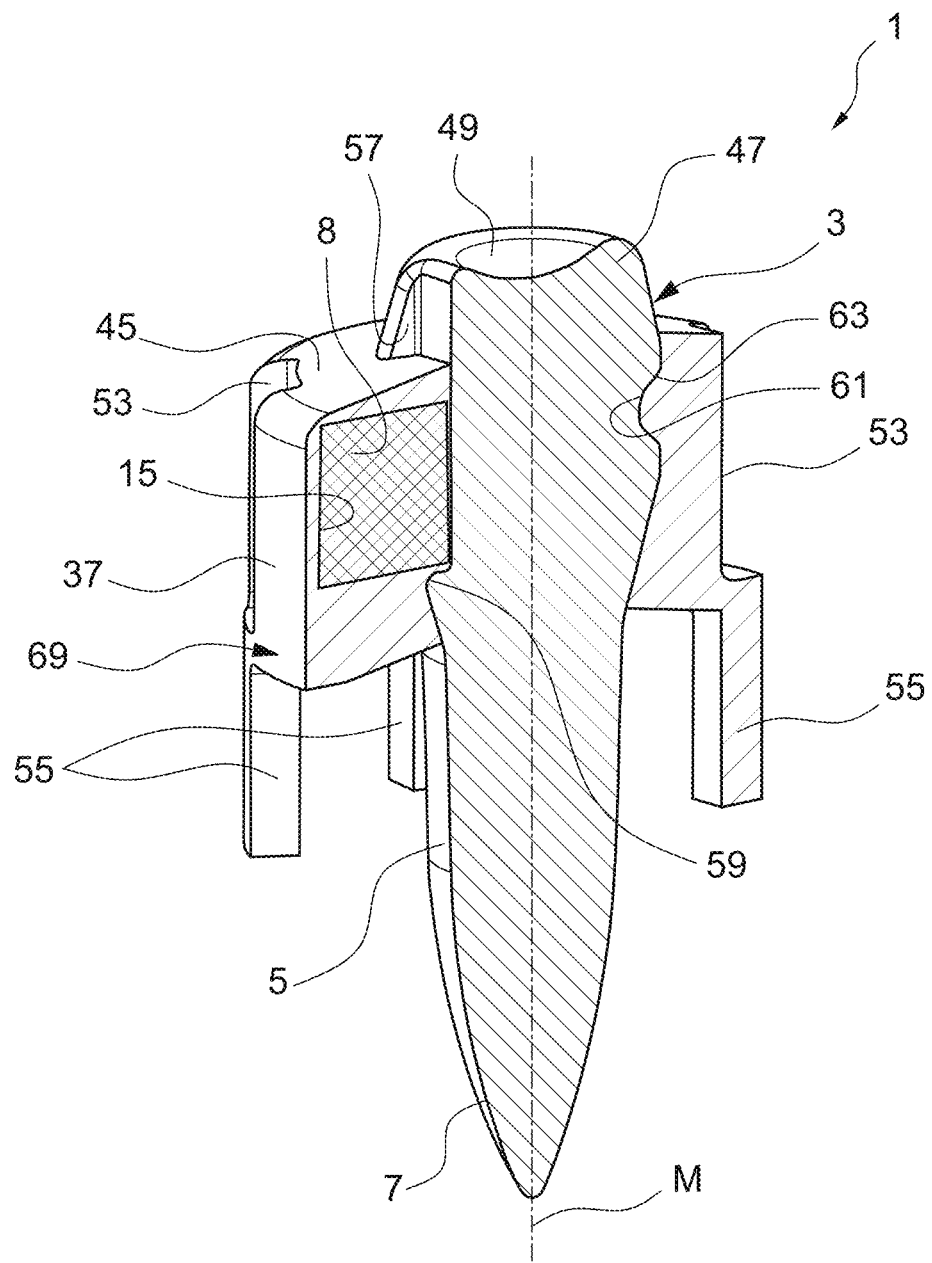
Figure 13:
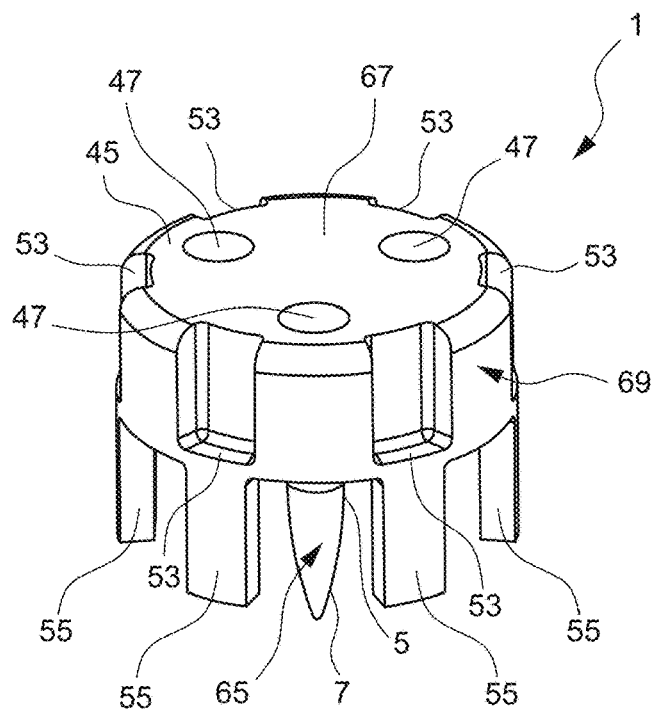
Figure 14:
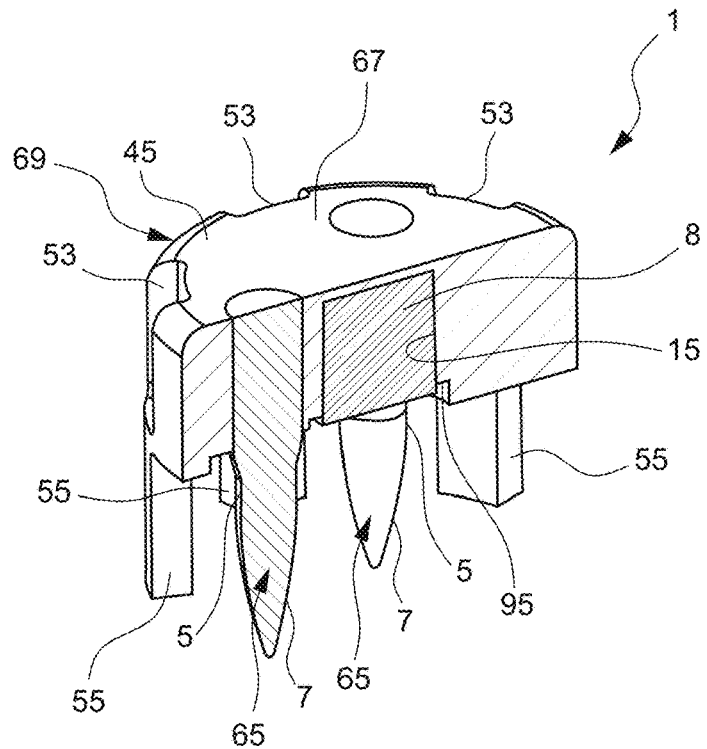
Figure 15:
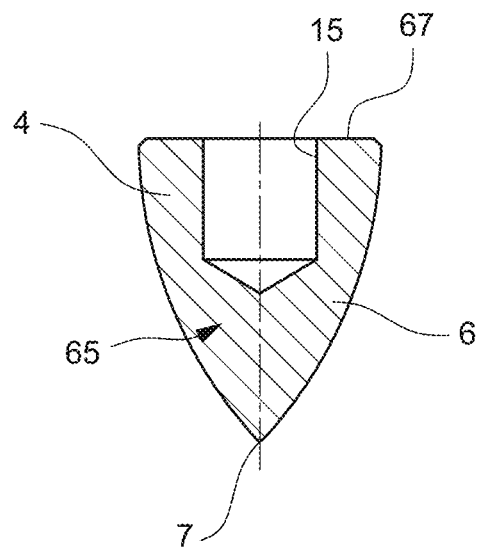
Figure 16:
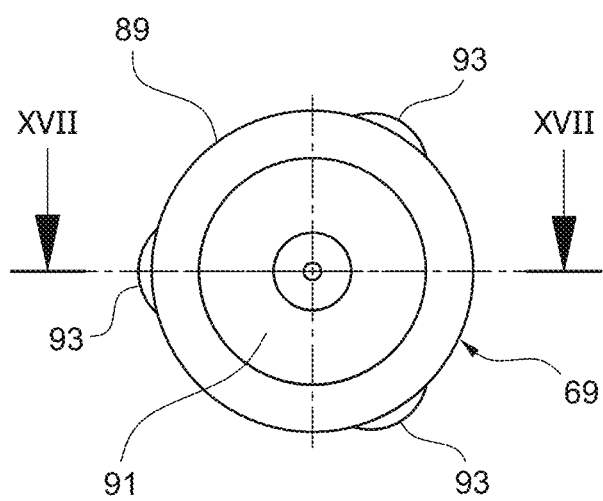
Figure 17:
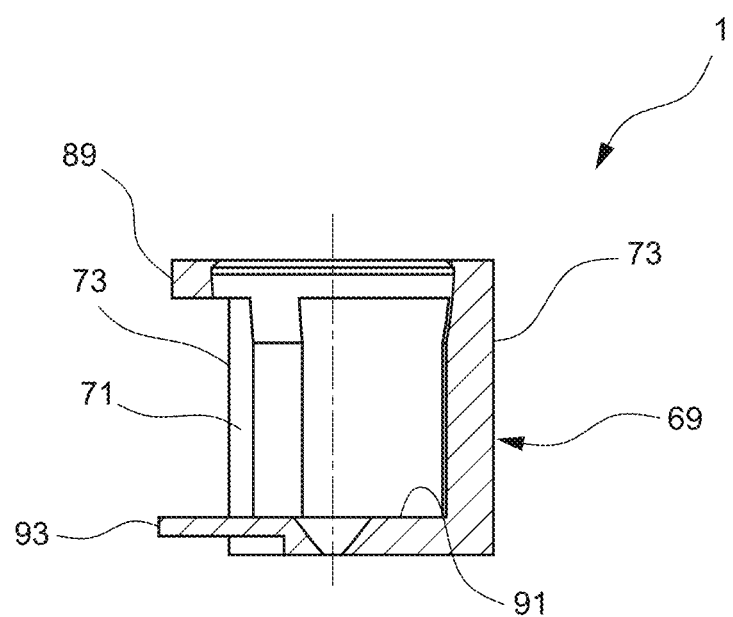

In the following, further properties, features and advantages of the invention will become clear by means of a description of preferred embodiments of the invention with reference to the accompanying exemplary drawings, in which show:

FIG. 1 a schematic view of a system for marking and identifying solids according to the invention;

FIG. 2 a perspective view of an exemplary embodiment of a device according to the invention;

FIG. 3 a sectional view of the device according to FIG. 2, which is arranged in a schematically illustrated barrel guide element of an insertion device;

FIG. 4 a perspective view of a further exemplary embodiment of a device according to the invention;

FIG. 5 a sectional view of the device of FIG. 4;

FIG. 6 a perspective sectional view of a further exemplary embodiment of a device according to the invention;

FIG. 7 a sectional view of the device according to FIG. 6;

FIG. 8 a perspective view of a further exemplary embodiment of a device according to the invention;

FIG. 9 a sectional view of the device according to FIG. 8;

FIG. 10 a perspective view of a further exemplary embodiment of a device according to the invention;

FIG. 11 a top view of the device according to FIG. 10;

FIG. 12 a sectional view of the device according to FIGS. 10 and 11;

FIG. 13 a perspective view of a further exemplary embodiment of a device according to the invention;

FIG. 14 a sectional view of the device according to FIG. 13;

FIG. 15 a sectional view of an insertion vehicle for a device according to the invention;

FIG. 16 a top view of a transport vehicle for a device according to the invention; and FIG. 17 sectional view of the transport vehicle from FIG. 16.

In the following description of exemplary embodiments of devices according to the invention, a device is generally provided with reference numeral 1 and a system according to the invention for marking and identifying solids is generally provided with reference numeral 100. In this context, identical or similar components are provided with identical or similar reference numerals.

FIG. 1 schematically shows the main components of a system 100 according to the invention for marking and identifying solid bodies, such as steel beams: namely, a device 1, preferably according to the invention, for locally associating electronic data to the solid body; and a separate read-out device 103 for reading out the electronic data, such as a device- and/or solid-body-specific identifier, with which the device 1 is provided. The read-out device 103 may be, for example, a reader, a scanner and/or a mobile electronic device, such as a smartphone or a tablet, with a device for reading out, in particular reading, retrieving and/or communicating, codes, such as bar codes, for example without a cable and/or without contact.

The actuation of the device 1 may be performed by a preferably pyrotechnical insertion device, such as a setting device, and/or may be realized in such a way that the device 1 can be inserted into the solid body in a non-destructive manner. An exemplary insertion device may comprise a guide element, such as a barrel, for receiving and guiding the device 1 during its acceleration during the insertion process, and a force transmission part, such as a striker, for actuating the device 1. When actuated by means of the power transmission member, the latter may strike the rear of the device 1 received in the guide member to cause the device 1 to move and accelerate. The transmitted energy/forces are selected in such a way that the device 1 itself can be inserted into hard solid body material.

The device 1 generally includes an insertion vehicle 65 designed for insertion into the solid body. The device 1 or the insertion vehicle 65 may comprise as main components a stern-side or rear-side application section 3, which may be, for example, a pin head, nail head, rivet head or screw head or a cramp bay, to be engaged by the preferably pyrotechnic insertion device, and a bow-side or front-side fastening section 5, such as a pin shaft, nail shaft, rivet shaft or screw shaft or a cramp leg, adjoining the application section 3 and extending substantially in the longitudinal direction of the device. Generally, the actuating section forms the stern and the fastening sections form the bow. In this regard, the elongated fastening section 5 may taper toward a fastening section tip 7, which may have, for example, a knurl not shown or an external thread not shown. Furthermore, the arrow with the reference sign B in FIG. 1 indicates an actuation direction in which the device according to the invention is to be or can be inserted into the solid body not shown, such as a steel structural member, by means of the preferably pyrotechnic insertion device.

The insertion vehicle 65 has a data carrier 8 (FIG. 3), in particular a read-out data carrier, for storing and/or providing electronic data. The data may have at least one device- and/or solid body-specific identifier that can be read by the readout device 103 for identifying and/or tracking the solid body.

FIGS. 2 and 3 show a first exemplary embodiment of a device 1 according to the invention, which will be addressed in detail below. The device 1 comprises an insertion vehicle 65 constructed to be inserted into the solid body. For example, the insertion vehicle 65 is constructed such that it can be inserted with an acceleration of at least 8000 m/s$^2$ and/or with a velocity of at least 20 m/s. In this embodiment, the insertion vehicle 65 substantially has an ogive shape. At the rear, the insertion vehicle 65 has a flat end face, also referred to as the rear surface 67, from which the outer contour of the insertion vehicle 65 extends in an ogive-like manner to a bow-side tip 7 opposite the rear surface 67 (cf. FIG. 3).

The insertion vehicle 65 is circumferentially surrounded by a transport vehicle 69, or the insertion vehicle 65 is substantially completely encased in the transport vehicle 69, the inner contour of which is shaped correspondingly with the ogive-like outer contour of the insertion vehicle 65. Basically, the transport vehicle 69 has a relatively thin wall thickness and is shaped at its outer contour substantially the same as the inner contour, i.e. also ogive-like. The transport vehicle 69 closes flush with the rear surface 67 at the rear. Furthermore, the transport vehicle 69 according to the embodiment shown in FIG. 2 has six longitudinal guide ribs 71 which are distributed uniformly in the circumferential direction and extend in the longitudinal direction of the insertion vehicle 65 and are arranged in particular in a fan-like manner with respect to a middle axis of the insertion vehicle 65. The longitudinal guide ribs 71 extend parallel to the longitudinal axis of the insertion vehicle and have at least three guide surfaces 73 facing away from the insertion vehicle, which are oriented substantially parallel to the longitudinal axis of the insertion vehicle. This means that the longitudinal guide ribs 71 protrude in a radial direction, i.e. transversely to the insertion vehicle longitudinal axis, from the outer circumference of the transport vehicle 69. Thereby, the radial protrusion of the longitudinal guide ribs 71 increases continuously with respect to the outer circumference of the transport vehicle 69 in the direction of the bow of the insertion vehicle 65. On the bow side, the longitudinal guide ribs 71 have flat end faces 75 that point essentially in the longitudinal axis of the insertion vehicle.

With reference to FIG. 3, an exemplary arrangement of the device 1 according to the invention is shown in a section of an insertion device 77. The insertion device 77 comprises a guide element 79, which according to FIG. 3 can be a hollow cylindrical barrel, as well as a power transmission part 81 arranged at the rear of the device 1, which can be, for example, a firing pin, which can be driven in particular by a pyrotechnic expansion energy in order to actuate the device 1. The guide element 79 may have a radial projection 83 on a cylindrical inner circumferential surface 85 onto which the device 1 is to be placed, in particular to define an axial mounting position. The force transmission part 81, for example a solid cylinder, rests at the rear on the rear surface 67, in particular in a contacting manner. When the insertion device 77 is actuated, the force transmission part 81 is accelerated in the direction of the device 1 to such an extent that it is accelerated or shot out of the guide element 79 and can leave the latter via the front opening 87 in order to be inserted or shot into the solid body. As it can further be seen in FIG. 3, the longitudinal guide ribs 71 contact the inner circumferential surface 85 of the guide element 79, in particular over the entire surface, with their guide surfaces 73. Thus, the longitudinal guide ribs 71, in cooperation with the inner circumferential surface 85 of the guide element 79, ensure a guided, rectilinear movement of the device 1. This also ensures that it is introduced into the solid as rectilinearly as possible, with the middle axis of the device 1 oriented substantially perpendicular to an outer surface of the solid body.

A data carrier 8 for storing and/or providing electronic data is arranged in a central recess 15, which extends axially in the direction of the lug 5 from an opening 13 arranged centrally in the rear surface 67 (cf. FIG. 2). This data carrier 8 is to be inserted into the solid body by means of the device 1 according to the invention or the insertion vehicle 65 of the device 1, so that the solid body is individually marked, for example, and it is possible subsequently to read out the electronic data by means of the separate read-out device 103. At the rear, the recess 15 is closed off by a protective housing 19, which according to FIG. 3 is implemented as a cover. However, the protective housing may also have, include or consist of one or more damping elements and/or one or more force deflection elements. In this regard, the front-side section of the device 1, which extends from an axial height of a recess base 17 to the tip 7, may form a sacrificial section 6 which is adapted to substantially absorb the forces, in particular acceleration forces and/or deformation forces, resulting as a consequence of the insertion of the insertion vehicle into the solid body. Further, the stern portion of the device 1 extending from an axial height of a recess base 17 to the stern surface 67 may form a protective portion 4 adapted to remain substantially intact during penetration of the insertion vehicle into the solid body.

With reference to FIGS. 4 and 5 and FIGS. 15 to 17, a further exemplary embodiment of a device 1 according to the invention is described. In order to avoid repetition, in general, the differences arising with respect to the preceding embodiments will be discussed.

In FIG. 4, the transport vehicle 69 has a flat disk 91 on the bow side, on the outer circumference of which at least three convexly curved guide lugs 93 distributed uniformly in the circumferential direction are provided. Furthermore, the transport vehicle 69 has at the rear a circumferential casing ring 89 which terminates flush with the rear surface 67 of the insertion vehicle 65. Here, the number of guide lugs 93 corresponds to the number of longitudinal guide ribs 71. Furthermore, the guide lugs 93 are circumferentially offset from the longitudinal guide ribs 71. The longitudinal guide ribs 71 can connect the bow-side disk 91 and the stern-side jacket ring 89 to one another in a strut-like manner, the insertion vehicle 65 being free on the outside except in the region of the disk 91 and the jacket ring 89, i.e. not surrounded by the transport vehicle 69. The longitudinal guide ribs 71 are arranged at a radial distance from the insertion vehicle 65. In this embodiment, the transport vehicle 69 may ostensibly serve to guide within the guide element 79 of the insertion device 77 and shear off upon impact of the device 1 with the solid body, thereby serving as a sacrificial material.

FIG. 5 is a sectional view of the device of FIG. 4 and shows the arrangement of the data carrier 8 integrated in the insertion vehicle 65, which is encompassed by the transport vehicle 69. The tip 7 protrudes slightly from the bottom of the disk 91 as an alternative to ensure possible locking of the device 1 to the solid body (not shown) by, for example, graining performed on the solid body (not shown). According to the invention, however, primarily the tip 7 of the insertion vehicle 65 is located flat with the disk 91 in order to keep the device 1 more processable, in particular stackable.

In the sectional view according to FIG. 15, the insertion vehicle 65 is shown as such, with no data carrier 8 being arranged in the recess 15. The insertion vehicle 65 has, for example, an axial length in the range from 5 mm to 50 mm, in particular in the range from 5 to 10 mm, and/or a diameter in the range from 3 mm to 30 mm, in particular in the range from 5 mm to 10 mm. An axial length of the recess 15 may be in the range of 1 mm to 15 mm, in particular in the range of 2 mm to 5 mm, for example.

In FIG. 16 the transport vehicle 69 is shown isolated in a plan view and in FIG. 17 in sectional view. An outer diameter of the outer ring 89 can be in the range of 5 mm to 35 mm, in particular in the range of 5 mm to 10 mm.

With reference to FIGS. 6 and 7, a further exemplary embodiment of a device 1 according to the invention will be discussed. In the exemplary embodiment according to FIGS. 6 and 7, the insertion vehicle 65 is formed substantially as a bolt or nail and comprises a rear nail head forming the application section 3 and facing the force transmission part (not shown) of the pyrotechnic insertion device, and an adjoining nail shaft forming the fastening section 5. The nail head 3 and the elongated nail shaft 5 are made of a single piece, preferably of a carbon steel, and are galvanized, for example, to be corrosion resistant. At the transition between nail head 3 and nail shaft 5, a neck section 9 of varying cross-section is provided, at which nail head 3 and nail shaft 5 merge integrally. Starting from the nail shaft 5, the neck section 9 widens continuously. This means that an outer dimensioning of the nail head 3 is significantly larger than an outer dimensioning of the adjoining, elongated nail shaft 5.

On an end face 11 of the nail-like insertion vehicle 65, or of the nail head 3, pointing counter to the direction of operation or actuation B, a substantially central opening 13 is provided, from which a recess 15 extends in the direction of the nail shaft 5. The recess or depression 15 extends, for example, by at least 30%, preferably at least 40%, at least 50% or at least 60%, of a longitudinal extent of the nail head 3 in the actuating direction B and/or in the direction of the nail shaft 5. The depression is bounded in the axial direction, i.e. in the actuating direction B or the longitudinal extent of the device, by a depression base 17 which is, for example, essentially flat and/or rotationally symmetrical with respect to the device middle axis M and/or is oriented essentially perpendicular to the actuating direction B. As can be seen in particular in FIGS. 6 and 7, the insertion vehicle 65 is designed as a substantially rotationally symmetrical component with respect to a middle axis M, which is indicated by a dash-dotted line.

The recess 15 accommodates a data carrier 8 embedded in or cast into a protective housing 19, which stores and/or provides electronic data, such as at least one device-specific and/or fixed body-specific identifier, such as an ID, and/or further data, such as origin, manufacturer, year of manufacture, etc. For example, the protective housing 19 may be made of plastic and may be provided with an additive reinforcing the plastic matrix. For example, the protective housing may also be formed from a polymer matrix preferably of resin or a two-component polymer. The protective housing 19 is positively and/or non-positively secured in the recess 15, which according to the exemplary embodiment shown in FIGS. 6 and 7 is implemented by a screw connection 21. This means that an actuating section sheath surrounding the recess 15, namely the nail head sheath 23, has an internal thread 25 which interacts, in particular engages, with an external thread 27 of the protective housing 19.

According to the exemplary embodiment of FIGS. 6 and 7, the data carrier 8 is completely surrounded by the protective housing 19. The data carrier 8 can be read out, for example, by a separate read-out device 103 (cf. FIG. 1), such as a reader, a scanner or the like, in order, for example, to be able to interrogate the device-specific and/or fixed body-specific identifier stored on the data carrier 8 and/or the further stored data. The data stored on the data carrier 8 can be, for example, digital codes or barcodes, in particular one-dimensional, two-dimensional or three-dimensional barcodes. The readout can be carried out optoelectronically and/or digitally, for example, preferably by means of electromagnetic waves.

The nail head jacket 23 is oversized in the axial direction with respect to the protective housing 19, so that it projects beyond the protective housing 19 against the actuation direction B, preferably by at least 5% and/or at most 20% of the longitudinal extent of the recess 15. This forms a preferably annular protrusion 29 which, in addition to the protective housing 19, provides further protection for the data carrier 8, so that the device 1 according to the invention can be used with a pyrotechnic delivery device, is capable of being highly accelerated and/or of absorbing high acceleration forces, such as at least 8,000 m/s$^2$.

With reference to FIG. 7, it can be seen in particular that the actuating section jacket surrounding the recess 15, such as nail head jacket 23, forms by means of the projection 29 an annular section 31 overlapping the protective housing 19 in the radial direction with respect to the middle axis M, which annular section 31 realizes an undercut or undercut with respect to the protective housing 19 in order to secure the latter in the axial direction. For example, the annular portion 31 forming the undercut may be formed by initially inserting the protective housing 19 axially into the recess 15, with no undercut initially formed. In a pre-assembly state, the annular section 29 can extend substantially completely in the axial direction and only be bent over in the radial direction after insertion of the protective housing 19 including the data carrier 8 in order to form the undercut. During the bending over, a curved bending contour 33 can be formed on the outside, for example, as can be seen in FIGS. 6 and 7.

In an alternative embodiment, the transport vehicle 69 may comprise only an ogival tapered tip 7 and an elongated nail shaft 5 without having a separate formation of the nail head 3. Through this, the nail shaft would serve as a force transmission part (not shown) of the pyrotechnic delivery device (not shown) (cf. FIG. 14). FIGS. 8 and 9 relate to an alternative embodiment of a device 1 according to the invention. In order to avoid repetitions, in general, the differences arising with respect to the preceding embodiments will be discussed.

In contrast to the preceding embodiment according to FIGS. 6 and 7, the insertion vehicle 65 of FIGS. 8 and 9 may have an external thread 35 extending substantially from the front face 13 of the device 1 to the neck portion 9. A mounting element, in particular a mounting ring 37, which may for example be made of metal or plastic, may be screwed onto the external thread 35 of the actuating portion 3 of the insertion vehicle 65, which mounting element has an internal thread 39 to ensure that the mounting ring 37 is screwed onto the insertion vehicle 65. The mounting element may also be secured to the insertion vehicle 65 in other ways, such as by suitable dimensioning, in particular interference or interference fit.

Another difference to the previous embodiment is that the recess is not completely formed by the actuating section side recess 15, but also partially by the mounting ring 37. The corresponding part of the recess, which is delimited by the mounting ring 37, is indicated by means of the reference sign 41. Accordingly, the recess 15 of the actuating section 3 is designed to be open to the outside. After the mounting ring 37 has been pushed or screwed onto the actuating section 3, the mounting ring 37 with the axially extending recess 41 is to be aligned with respect to the recess 15 in such a way that the recesses 41, 15 face each other, in particular that they form a closed blind hole-like recess. The data carrier 8 is inserted into this recess formed by mounting ring 37 and mounting section 15.

The data carrier 8 can, for example, be inserted into the recess in such a way that the data carrier 8 remains within the recess 15, 41 even after the device 1 has been actuated, for example by means of an insertion device. The inner recess walls are realized as essentially flat surfaces and at least the wall part of the actuating section 3, which faces the data carrier 8 and is provided with the reference sign 43, does not have a thread. As can be clearly seen from the synopsis of FIGS. 8 and 9, the data carrier 8 is eccentric with respect to the middle axis M of the device 1, i.e. arranged at a radial distance with respect thereto. Axially, the actuating section 3 projects beyond an end face 45 of the mounting ring 37. The projecting, substantially cylindrical projection 47 forms a force application point 49 for the insertion device on the end face. Due to the eccentric mounting of the data carrier 8, an uninterrupted force path is provided from the central force application point 49 to the axially opposite tip 7 of the insertion vehicle 65.

Furthermore, a substantially hollow cylindrical guide disk 97 is provided, which completely surrounds the insertion vehicle 65 at the bow side of the mounting ring 37 and essentially serves to form a guiding and/or sliding contact with an inner peripheral surface 85 of the guide element 79 of the insertion device 77. With reference to FIGS. 10 to 12, a further exemplary embodiment of a device 1 according to the invention will be described. In order to avoid repetitions, in general, the differences arising with respect to the preceding embodiments will be discussed.

Similar to the embodiment of FIGS. 8 and 9, the device 1 in FIGS. 10 to 12 has a mounting ring 37, which is pushed or pressed onto the insertion vehicle 65 via an interference fit. The mounting ring 37 of FIGS. 10 to 12 is manufactured, for example, as a plastic injection-molded part and has a crown-like structure, which will be discussed below. Further, the mounting ring 37 comprises a substantially cylindrical region 51 which is continuous according to FIGS. 8 and 9 and is circumferentially interrupted by axial recesses 53 according to FIGS. 10 to 12. Axially, the cylindrical region 51 opens into a plurality of guide tines 55 evenly distributed with respect to the circumference, which are oriented in the axial direction and serve to provide guidance of the device 1 within a barrel of the insertion device. For example, the guide tines 55 may be arranged such that they are not co-fired into the solid body but break off from the mounting ring 37 upon contact with the outer surface of the solid body so that they form a type of sacrificial material. Furthermore, it is possible to couple the guide tines 55 to the mounting ring 37 via a hinge joint (not shown), for example a film hinge, so that upon contact with the outer surface of the solid body, the guide tines 55 fold away about the pivot axis defined by the hinge joint.

The essentially cylindrical projection 47 of the actuating section 3 or of the insertion vehicle 65, which projects axially beyond an end face 45 of the mounting ring 37, has an axial groove 57 which extends from the axial height of the force application point 49 to below the data carrier 8 (see FIG. 12). Below the data carrier 8, the actuating section 3 projects radially to form a circumferential annular projection 59. Via the axial groove 57, it is possible to mount the data carrier 8 in the recess 15 formed inside the mounting ring 37 when the mounting ring 37 has already been mounted. Alternatively, as shown in FIG. 12, the data carrier 8 is completely overmolded, molded or cast by plastic material of the mounting ring 37. In this case, the axial groove 57, to which the mounting ring 37 is molded in a complementary shape, may serve to provide an anti-rotation feature. Opposite the axial groove 57, the mounting vehicle 65 has an annular circumferential recess 61 which has a curved cross-section. A curved lug-like projection 63 of the mounting ring 37 engages the recess 61 to provide axial retention of the mounting ring 37 to the actuating section 3.

FIGS. 13 and 14 show a further exemplary embodiment of a device 1 according to the invention. In order to avoid repetitions, in general, the differences arising with respect to the preceding embodiments will be discussed.

The embodiment according to FIGS. 13 and 14 is substantially similar to the embodiment according to FIGS. 10 to 12. In contrast to FIGS. 10 to 12, the device 1 according to FIGS. 13 and 14 has a larger radial dimension. This is due to the fact that the device 1 is designed as a so-called triple nail and comprises three insertion vehicles 65, which are arranged offset relative to one another and are each accommodated in the mounting element 37 and fastened therein. Furthermore, in contrast to FIGS. 10 to 12, the recess 15 for the data carrier 8 is arranged centrally. However, in contrast to the preceding embodiments, the recess 15 is not accessible from the stern, but from the bow. This means that the opening 95 is arranged on the bow side of the mounting element. As can be seen from FIGS. 13 and 14, the device 1 does not comprise a projection 47. This means that the insertion vehicles 65 are dimensioned with respect to the mounting ring 37 so that they are level and flush with each other to form a substantially level stern surface 67 over the entire radial extent.

In alternative embodiments, as shown in FIGS. 13 and 14, the device 1 may be configured to provide two or more insertion vehicles 65 offset from each other and each received in and secured to a mounting member 37. The recesses 15 in a triform multiple embodiment may also be from the rear. Such embodiments are not shown in the figures.

The features disclosed in the foregoing description, figures, and claims may be significant both individually and in any combination for the realization of the invention in the various embodiments.

LIST OF REFERENCE SIGNS 1 device
3 application section
4 protection section
6 sacrificial section
5 fixing section
7 tip
8 data carrier
9 neck section
11 front side
13 central opening
15 recess
17 recess floor
19 protective housing
21 threading
23 nail head jacket
25 male thread
27 internal thread
29 projection
31 ring section
33 bending contour
35 male thread
37 mounting ring
39 internal thread
41 recess
43 recess wall
45 front face
47 protrusion
49 force entry position
51 cylindrical area
53 recess
55 guide tines
57 axial groove
59 ring protrusion
61 recess
63 protrusion
65 insertion vehicle
67 stern area
69 transport vehicle
71 longitudinal guide rib
73 guide surface
75 front face
77 applicator/insertion device
79 guide element
81 force transmission part
83 radial protrusion
85 internal circumferential surface
87 opening of the guide element
89 jacket ring
91 disk
93 guide lug
95 opening
97 guide disk
100 system
103 reader
B actuating direction
M middle axis

The invention claimed is:

1. Device for locally associating electronic data to a solid body, comprising:
   an electronic data carrier for storing and/or providing the electronic data; and
   an insertion vehicle containing the data carrier, the insertion vehicle being configured such that it is insertable into a solid body having Rockwell values from 30 HRC to 70 HRC and/or from HV 100 to HV 600 (Vickers hardness) at a velocity of at least 20-m/s and/or with an acceleration of at least 8000 m/s$^2$ while avoiding undesired damage to the electronic data carrier.

2. Device according to claim 1, wherein the insertion vehicle is shaped rotationally symmetrical with respect to a middle axis and/or at least sectionally shaped in an ogive-like manner.

3. Device according to claim 1, wherein the insertion vehicle includes a bow and a stern, wherein a recess is formed in the stern, in which the data carrier is arranged and at least partially encapsulated within the recess.

4. Device according to claim 3, wherein the data carrier is introduced into the recess such that fastening forces acting between the data carrier and the recess wall are adapted to motion forces transferred to the insertion vehicle.

5. Device according to claim 4, wherein the fastening forces are adapted to the motion forces transferred to the insertion vehicle such that the data carrier remains fixed in the recess after the introduction of the insertion vehicle into the solid body.

6. Device according to claim 1, wherein the insertion vehicle has a bow-side sacrificial section, which is pointed, and connected thereto a stern-side protective section, in which the data carrier is arranged.

7. Device according to claim 6, wherein the sacrificial section is configured-to essentially absorb the forces resulting from the introduction of the insertion vehicle into the solid body, and/or wherein the protective section is configured to remain essentially unscathed while the insertion vehicle enters into the solid body.

8. Device according to claim 1, wherein the data carrier is arranged concentrically with respect to a middle axis of the insertion vehicle and wherein the insertion vehicle has a planar, annular stern-side force application surface for applying the motion forces to be transferred to the insertion vehicle.

9. Device according claim 1
wherein the data carrier is contained in a stern-side protective section of the insertion vehicle under provision of a force application ring for applying the motion forces to be transferred to the insertion vehicle such that an unimpeded flow of forces from a planar, annular stern-side force application surface via the force application ring to a sacrificial section connected to the protective section is enabled.

10. Device according to claim 1, wherein the data carrier is arranged in a recess formed in the insertion vehicle and the recess extends axially from a stern-side end face in the direction of a tip of the insertion vehicle opposite from the stern-side end face for less than 50% of a total longitudinal extension of the insertion vehicle.

11. Device, in particular according to claim 1
wherein the insertion vehicle is contained inside of a transport vehicle.

12. Device according to claim 11, wherein the transport vehicle at its stern-side ends flush with a stern-side end face, wherein the transport vehicle includes a jacket shaped corresponding to the insertion vehicle which at its stern-side ends flush with a stern-side end face of the insertion vehicle.

13. Device according to claim 11, wherein the transport vehicle
includes at least three circumferentially distributed longitudinal guide ribs, wherein the longitudinal guide ribs extend parallel to the longitudinal axis of the insertion vehicle and/or wherein the longitudinal guide ribs have guiding surfaces facing away from the insertion vehicle, the guiding surfaces being aligned essentially parallel to the longitudinal axis of the insertion vehicle.

14. Device according to claim 1,
wherein the data carrier is contained by the insertion vehicle such that an unimpeded flow of forces from a central force application position at a stern-side end face of the insertion vehicle into a stern of the insertion vehicle is enabled.

15. Device according to claim 1, wherein the insertion vehicle includes a stern-side force application position for an insertion device and wherein a flow of forces can form axially from the force application position in the solid material of the insertion vehicle into a stern of the insertion vehicle.

16. Device according to claim 1, wherein the data carrier provides the data in form of a digital code or bar code, wherein the data carrier is readable opto-electronically and/or digitally.

17. System for marking and identifying solid bodies comprising a device according to claim 1, and a separate reader device for reading the electronic data.

18. System according to claim 17, further comprising a pyrotechnically operable insertion device, for inserting the device for locally associating electronic data into the solid body.

19. Device according to claim 1, wherein the device is configured such that insertion of the device into the solid body allows use of the solid body for its intended purpose.

20. The combination of a solid body having Rockwell values from 30 HRC to 70 HRC and/or from HV 100 to HV 600 (Vickers hardness) and the device according to claim 1 inserted into the solid body.

21. Device for locally associating electronic data to a solid body, comprising:
an electronic data carrier for storing and/or providing the data to be associated; and
an insertion vehicle containing the data carrier;
wherein the insertion vehicle is contained inside of a transport vehicle, wherein the transport vehicle at its bow-side includes a planar disc, on the outer circumference of which at least three circumferentially, distributed guiding lugs, which are curved to be convex, wherein the number of the guiding lugs equals the number of the longitudinal guide ribs and/or wherein the guiding lugs are arranged circumferentially offset with respect to the longitudinal guide ribs.

22. Device for locally associating electronic data to a solid body, comprising:
an electronic data carrier for storing and/or providing the electronic data; and
an insertion vehicle containing the data carrier, the insertion vehicle being configured such that it is insertable into the solid body at a velocity of at least 20 m/s and/or with an acceleration of at least 8000 m/s$^2$;
wherein the data carrier is encapsulated, wherein the encapsulation is realized by a protective housing arranged in the recess, which protective housing completely surrounds the data carrier.

23. Device according to claim 22, wherein the protective housing is made of plastic, and wherein the plastic comprises an additive reinforcing the plastic matrix and/or a plastic matrix of resin or a of two-component polymer.

24. Device according to claim 22, wherein the encapsulation is realized in that the data carrier is embedded into a plastic protective housing through a plastic injection moulding process or in that the data carrier is overmoulded with the protective housing.

25. Device according to claim 22, wherein the protective housing is dimensioned such that and/or arranged in the recess such that a jacket of the stern, surrounding the recess in the circumferential direction, extends beyond the protective housing in the longitudinal direction of the insertion vehicle, wherein an annular projection, which extends for at least 5% and/or no more than 20% of the longitudinal extension of the recess.

26. Device according to claim 22, wherein the protective housing is positively and/or frictionally fastened in the recess.

27. Device for locally associating electronic data to a solid body, comprising:
an electronic data carrier for storing and/or providing the electronic data; and
an insertion vehicle containing the data carrier, the insertion vehicle being configured such that it is insertable into the solid body at a velocity of at least 20 m/s and/or with an acceleration of at least 8000 m/s$^2$;
wherein the insertion vehicle comprises a middle axis and the data carrier is arranged eccentrically on the insertion vehicle with regard to the middle axis and/or wherein the insertion vehicle is essentially unscathed along a preferably axial connection line between the force application position and the bow-side tip of the insertion vehicle.

\* \* \* \* \*